United States Patent [19]

Watanabe et al.

[11] Patent Number: 5,069,764

[45] Date of Patent: Dec. 3, 1991

[54] CARBON ELECTRODE HAVING LOW POLARIZABILITY

[75] Inventors: Nobuatsu Watanabe, 136, Uguisudai, Nagaokakyou-shi, Kyoto; Tetsuro Tojo; Yong-bo Chong, both of Kyoto; Kenji Ikari, Saga, all of Japan

[73] Assignee: Nobuatsu Watanabe, Kyoto, Japan

[21] Appl. No.: 389,644

[22] Filed: Aug. 4, 1989

[30] Foreign Application Priority Data

Aug. 5, 1988 [JP] Japan .................................. 63-194373

[51] Int. Cl.$^5$ ......................... C25B 1/24; C25B 11/06
[52] U.S. Cl. ................................. 204/60; 204/290 R; 204/291; 204/294
[58] Field of Search ............. 204/60, 291, 294, 290 R, 204/128; 427/58, 113, 126.1, 431, 432

[56] References Cited

U.S. PATENT DOCUMENTS

| | | | |
|---|---|---|---|
| 2,422,590 | 6/1947 | Schumb et al. | 204/60 |
| 4,312,718 | 1/1982 | Watanabe et al. | 204/60 |
| 4,600,481 | 7/1986 | Sane et al. | 204/67 |

FOREIGN PATENT DOCUMENTS 49-015559  4/1974  Japan ................................. 204/294

OTHER PUBLICATIONS

"The Effects of the Lithium Fluoride Impregnated Carbon Anode on the Fluorine Generation", Watanabe et al., *Journal of Electrochemistry, Japan*, vol. 31, pp. 698–700, 1963.

*Primary Examiner*—John F. Niebling
*Assistant Examiner*—Kathryn Gorgos
*Attorney, Agent, or Firm*—Armstrong, Nikaido, Marmelstein, Kubovcik & Murray

[57] ABSTRACT

Disclosed is a carbon electrode having low polarizability, comprising a porous carbon block and, contained in the pores thereof, a metal fluoride mixture composed of LiF and a metal fluoride other than LiF. This carbon electrode can easily be obtained by a skillful impregnation method. When such a carbon electrode is used as an anode in electrolyzing an electrolyte comprising a mixed molten salt system of potassium fluoride and hydrogen fluoride in an electrolytic cell, polarization of the anode is extremely low and the anode effect is remarkably suppressed so that the electrolysis can stably be performed while exhibiting not only a high anodic current density but also a low voltage.

5 Claims, 3 Drawing Sheets

FIG. 3
(PRIOR ART)
SAMPLE C

FIG. 4
SAMPLE D

CARBON ELECTRODE HAVING LOW POLARIZABILITY

BACKGROUND OF THE INVENTION

1. Field of the Invention

The present invention relates to a carbon electrode. More particularly, the present invention is concerned with a carbon electrode having low polarizability which is useful as an anode to be employed in the electrolysis of a molten salt system containing a fluoride, and a method for producing the same. The present invention also relates to a method for producing fluorine by the electrolysis of an electrolyte comprising a mixed molten salt system of potassium fluoride and hydrogen fluoride, the electrolysis being conducted in an electrolytic cell using as an anode this novel electrode having low polarizability.

2. Discussion of Related Art

In the electrolysis of a molten salt electrolyte comprising a fluoride by the use of a carbon electrode as an anode, there is generally observed occurrence of the so-called anode effect which is represented by an abrupt spontaneous rise of voltage and decrease of current due to the anodic polarization. In practicing the conventional method of electrolyzing a molten salt electrolyte comprising a fluoride, various difficulties have been encountered due to the occurrence of such anode effect.

With respect to the electrolytic production of fluorine by using a molten salt electrolyte of a KF-2HF system and a carbon anode, the operation is conducted, for example, under such conditions that an electrolytic cell of 5000 A scale is employed and the electrolysis is conducted at an anodic current density of 10 to 13 A/dm$^2$. Under such a load, the cell voltage is 10 V. In the case of the electrolytic production of fluorine, despite the fact that the anodic current density is as small as one-fifth that exhibited in the electrolysis of brine, the cell voltage is as high as 2.3 times that exhibited in the electrolysis of brine. Most of this high cell voltage exhibited in the electrolytic production of fluorine is accounted for by the anodic overvoltage, and the energy of this overvoltage is dissipated as Joule heat. The reason why an anodic current density exhibited in the electrolysis of a fluoride is so low is that a film of graphite fluoride having an extremely low surface energy is formed on the carbon electrode due to the reaction between the evolved fluorine and the carbon electrode during the course of the electrolysis reaction, thereby interrupting the contact between the carbon electrode and the electrolyte. This phenomenon is so-called "anode effect". The anode effect is represented by an abrupt spontaneous rise of voltage and decrease of current due to the anodic polarization. If the anode effect occurs even once, it is extremely difficult to bring the electrolysis back to the normal state, and it becomes necessary to take the electrode out of the electrolyte and polish the electrode, or to replace the electrode and the electrolyte with fresh ones. Therefore, various problems are disadvantageously encountered in operational administration, and this is one of great factors rendering it difficult to perform the electrolytic production of fluorine.

In order to obviate the above problems, there have been proposed a method in which lithium fluoride is added to an electrolyte of a KF-2HF system in an amount exceeding the solubility, and a method in which a fluoride, such as lithium fluoride, is incorporated in the molding material for a carbon block before molding and calcination (see, for example, U.S. Pat. No. 4,312,718). However, neither of the above-mentioned methods is satisfactory with respect to the suppression of the anode effect. Further, in the case of the method in which lithium fluoride is added to the electrolyte in an amount exceeding the solubility, a sludge of lithium fluoride is likely to accumulate on the bottom of the electrolytic cell. This accumulation of the sludge not only leads to an iR loss, but also to a nonuniformity in heat conduction and, thus, local differences in the temperature of the electrolytic bath, thereby adversely affecting the circulation of the electrolytic bath. Further, the sludge may clog the communicating portions in the electrolytic cell, or stick to the bottom of the cell so fixedly that the sludge cannot easily be scraped off. On the other hand, in the method in which a fluoride such as lithium fluoride is incorporated in the molding material for a carbon block, the carbon material is blended with lithium fluoride, and the resultant blend is molded and then calcined. In the resultant carbon block, the lithium fluoride is not contained in the pore phase but in the carbon matrix phase of the resultant porous carbon block. The calcination for producing a carbon block must be conducted at a temperature of from 800° to 1,200° C. However, lithium fluoride is not stable at a temperature of higher than about 800° C. and, therefore, not only is a large portion of the lithium fluoride incorporated in the carbon matrix phase likely to be melted out and partly vavorized away during the calcination, but also the incorporation of lithium fluoride in the carbon block is likely to be non-uniform, so that the effect of the incorporation of lithium fluoride is unsatisfactory.

SUMMARY OF THE INVENTION

The present inventors have made extensive and intensive studies with a view toward developing a novel lithium fluoride (LiF)-containing carbon electrode having low polarizability which is useful as an anode in the electrolysis of a molten salt system containing fluoride and which is capable of suppressing the anode effect during the electrolysis. As a result, it has unexpectedly been found that when a metal fluoride mixture composed of LiF and at least one metal fluoride other than LiF, said metal fluoride mixture having a melting temperature lower than that of LiF and having a surface tension lower than that of LiF at a temperature of not lower than the melting temperature of said metal fluoride mixture, is heated to a temperature of not lower than the melting temperature thereof to obtain a molten metal fluoride mixture, and the molten metal fluoride mixture is then contacted with a porous carbon block under a predetermined superatmospheric pressure; the molten metal fluoride mixture can easily be introduced into the pores of the porous carbon block, whereby LiF can be uniformly and stably contained in the carbon block. This treatment for introducing LiF into the pores of the porous carbon block will hereinafter often be referred to simply as "impregnation" or similar expression. Further, it has surprisingly been found that when the carbon electrode obtained by the above method, comprising a porous carbon block and, contained in the pores of said porous carbon block, a metal fluoride mixture composed of LiF and a metal fluoride other than LiF is used as an anode in the production of fluorine by electrolyzing an electrolyte comprising a mixed molten salt system of potassium fluoride and hydrogen fluoride in an electrolytic cell, polarization of the anode is extremely low and the anode effect is remarkably suppressed, so that the electrolysis can stably be performed while exhibiting not only a high anodic current density but also a low voltage. The present invention has been completed on the basis of these novel findings.

It is, therefore, an object of the present invention to provide a novel carbon electrode having low polarizability in which LiF is stably and uniformly contained.

It is another object of the present invention to provide a method for producing the above electrode having low polarizability, which can easily be conducted.

It is still another object of the present invention to provide a method for producing fluorine by electrolyzing an electrolyte comprising a mixed molten salt system of potassium fluoride and hydrogen fluoride in an electrolytic cell, which can stably be performed at a high current density and a low voltage.

The foregoing and other objects, features and advantages of the present invention will be apparent from the following detailed description and appended claims taken in connection with the accompanying drawings.

DETAILED DESCRIPTION OF THE INVENTION

In one aspect of the present invention, there is provided a carbon electrode having low polarizability, comprising a porous carbon block and, contained in the pores of said porous carbon block, a metal fluoride mixture composed of LiF and a metal fluoride other than LiF.

The characteristic features of the carbon electrode of the present invention will now be described with reference to the method for the production thereof.

With respect to the porous carbon block to be used in the present invention, there is no particular limitation, and any of the fluoride-containing porous carbon blocks used as a conventional carbon electrode can be employed. For example, there may be employed a carbon block prepared by subjecting to extrusion molding or vibration molding a mixture of a coke such as pulverized petroleum coke and pitch coke as a base material and a coal-tar pitch as a binder and calcining the resultant molded block at a temperature of from about 800° to 1,200° C. by a customary method. By this calcination, a porous carbon block can be obtained. A carbon block having a porosity in the range of from about 2% to about 30% is generally employed. An isotropic carbon disclosed in U.S. Pat. No. 4,312,718 may preferably be employed.

The metal fluoride other than LiF, which is to be mixed with LiF for preparing a metal fluoride mixture, is selected in accordance with a criterion such that the resultant metal fluoride mixture exhibits a melting temperature lower than that of LiF and exhibits a surface tension lower than that of LiF at a temperature of not lower than the melting temperature of the metal fluoride mixture. In general, such a metal fluoride other than LiF can be selected from the group consisting of KF, NaF, CsF, $MgF_2$, $CaF_2$ and $AlF_3$. These metal fluorides can be employed individually or in combination.

The metal fluoride mixture may be either a two-component system inclusive of LiF or a three or more-component system inclusive of LiF, but usually, a two-component system is sufficient to attain the object of the present invention. The proportions of the components of the metal fluoride mixture are such that the resultant metal fluoride mixture has a melting temperature lower than that of LiF and a surface tension lower than that of LiF at a temperature of not lower than the melting temperature of the metal fluoride mixture, and that the content of LiF as the active ingredient is at least about 30% by mole, based on the total mole of all of the components of the metal fluoride mixture. From the above viewpoints, in the case of a two-component system, the molar ratio of LiF to the other metal fluoride is 0.4 to 2.5, preferably 0.7 to 1.5, more preferably 0.9 to 1.1. In the case of a two-component system, the molar ratio of LiF to the other metal fluoride of about 1:1 usually brings about satisfactory results.

The carbon electrode of the present invention is produced by introducing LiF into the pores of the porous carbon block in the form of a molten metal fluoride mixture composed of LiF and a metal fluoride other than LiF. The LiF per se has a melting temperature as high as 842° C. and a surface tension as large as 255.9 dyne $cm^{-1}$ at a temperature of 847° to 1247° C. On the other hand, with respect to a molten metal fluoride mixture composed of LiF and KF at a molar ratio of, for example, 1:1, the melting temperature is as low as 492° C. and the surface tension is as small as 166 dyne cm$^{-1}$ at 800° C., and thus, the introduction of such a molten metal fluoride mixture into the pores of a porous carbon block can easily be performed by application of an appropriate superatmospheric pressure.

With respect to the method for introducing a metal fluoride mixture composed of LiF and a metal fluoride other than LiF into the pores of a porous carbon block, there is no particular limitation as long as the metal fluoride mixture is introduced into the pores of the porous carbon block at a packing ratio of at least 30%, preferably at a packing ratio of at least 50%, more preferably at a packing ratio of 65% or more. For example, the introduction of a metal fluoride mixture into the pores of a porous carbon block can easily be performed by heating a metal fluoride mixture of LiF and at least one metal fluoride other than LiF to a temperature of not lower than the melting temperature thereof to obtain a molten metal fluoride mixture; contacting a porous carbon block with said molten metal fluoride mixture under a predetermined superatmospheric pressure to thereby introduce said molten metal fluoride mixture into the pores of said porous carbon block; and cooling the resultant carbon block having said molten metal fluoride mixture contained therein to a predetermined temperature, usually room temperature. In the above method, by controlling the value of the superatmospheric pressure under which the porous carbon block is contacted with the molten metal fluoride mixture, a desired packing ratio of the metal fluoride mixture introduced in the pores of the carbon block can be attained.

The above method will be described hereinbelow in more detail. For example, a metal fluoride mixture composed of LiF and KF at a molar ratio LiF/KF of 1/1 is prepared. The above mixture is heated to, for example, 850° to 900° C. in a crucible to obtain a molten metal fluoride mixture, followed by cooling to 500° to 600° C., and then, a porous carbon is put in the crucible, thereby contacting the porous carbon block with the molten mixture. Alternatively, the porous carbon block may be put into a crucible together with a metal fluoride mixture before heating, followed by heating the metal fluoride mixture together with the porous carbon block to melt the metal fluoride mixture. Then, the porous carbon block is immersed in the molten metal fluoride mixture by means of pressing means made of carbon material, and held as it is immersed. The crucible is placed in a pressure vessel and the internal pressure of the vessel is reduced to 10 to 50 mmHg, and heated at a temperature elevation rate of about 5° to 10° C./minute to a temperature such that the viscosity of the molten metal fluoride mixture composed of LiF and KF becomes about 0.2 to 0.3 poise. The reduction of pressure is conducted not only for removing the air contained in the pores of the porous carbon block, thereby facilitating the introduction of the molten mixture into the pores of the porous carbon block, but also for preventing the porous carbon block from being oxidized. Next, an inert gas, such as nitrogen and argon, is introduced into the pressure vessel until the internal pressure reaches 50 to 100 kg/cm$^2$, and the immersion of the porous carbon block in the molten metal fluoride mixture is maintained under that pressure for a period of about 30 minutes to about 2 hours. Subsequently, the carbon block is taken out of the pressure vessel, and left in the atmosphere to cool to the ambient temperature, thereby obtaining a carbon electrode having low polarizability of the present invention, comprising the porous carbon block and, contained in the pores of the porous carbon block, the metal fluoride mixture composed of LiF and KF.

In the carbon electrode of the present invention, the metal fluoride mixture is contained in an amount of 0.5 to 30% by weight, preferably 1 to 25% by weight, more preferably 3 to 20% by weight as expressed in terms of the amount of LiF based on the weight of the porous carbon block. A desired amount of LiF in the carbon electrode can be obtained by controlling the content of LiF in the metal fluoride mixture and the packing ratio of the metal fluoride mixture introduced in the pores of the porous carbon block.

The amount of LiF based on the weight of the porous carbon block can be obtained as follows. A carbon electrode impregnated with a metal fluoride mixture (e.g. LiF-KF mixture) of the present invention is maintained at 1,200° C. in an atmosphere of inert gas so that a large portion of the LiF-KF mixture is melted out of the pores into a boat and a minute portion of the LiF-KF mixture is vaporized and the vapor is trapped by liquefied nitrogen. The melted-out LiF-KF mixture and trapped LiF-KF mixture are put in water (room temperature). The KF has high solubility in water and, therefore, dissolved in water, whereas LiF is sparingly soluble and precipitates. Therefore, the LiF can be separated from the KF by filtration. Thus, the amount of LiF in the carbon electrode can easily be obtained. On the other hand, the weight of the original porous carbon block can easily be obtained by weighing the LiF-KF mixture-removed porous carbon block obtained by the above-mentioned heat treatment at 1,200° C.

The terminology "the packing ratio (X) of the metal fluoride mixture" herein used is intended to mean the ratio (%) of the pore volume of the pores of the porous carbon block which are packed with a metal fluoride mixture, relative to the entire pore volume (100%) of the original porous carbon block. The packing ratio can be calculated from the formula:

$$B = A + XPA'$$

wherein A is the bulk density of the porous carbon block, A' is the true density of the porous carbon block, P is the porosity of the porous carbon block, B is the specific gravity of the carbon electrode having contained therein a metal fluoride mixture and X is the packing ratio of the metal fluoride mixture.

The porosity is measured by means of a mercury porosimeter.

The thus obtained carbon electrode has, contained in the pores thereof, a metal fluoride mixture composed of LiF and a metal fluoride other than LiF, and the metal fluoride mixture is packed in the pores of the carbon electrode with the high degree of uniformity, particularly in the surface portion of the carbon electrode. By contrast, the conventional carbon electrode containing LiF as disclosed in U.S. Pat. No. 4,312,718, contains the LiF in the carbon matrix phase of the carbon electrode while leaving the pores of the carbon electrode open, differing from the carbon electrode of the present invention which has, contained in the pores thereof, a metal fluoride mixture composed of LiF and a metal fluoride other than LiF. As described before, the conventional carbon electrode containing LiF is produced by blending a carbon material as a base material, a pitch as a binder and LiF, molding the resultant blend to form a molded product and calcining the molded product at a temperature of from 800° to 1,200° C. to obtain a final carbon electrode. A large portion of the LiF in the carbon matrix phase is likely to be melted out and a minute portion of the LiF is vaporized away during the calcination and, therefore, not only is it difficult for the final carbon electrode to contain LiF in an amount sufficient for well suppressing the anode effect but also the distribution of the LiF in the carbon matrix phase of the carbon electrode is extremely non-uniform, which is disadvantageous in that the occurrence of the anode effect cannot be effectively prevented.

In addition, it should be noted that when a carbon material is blended with LiF in an amount of more than several percent, particularly more than 5%, the resultant carbon electrode having such an amount of LiF in the carbon matrix becomes very weak; particularly, it has very low flexual strength and, therefore, is likely to break during the electrolysis. By contrast, the carbon electrode of the present invention has a metal fluoride containing LiF in the pores of the carbon block and, therefore, the flexual strength of the carbon electrode becomes larger by at least about 5% than that of the original porous carbon block before being impregnated with the metal fluoride.

Figure 5:
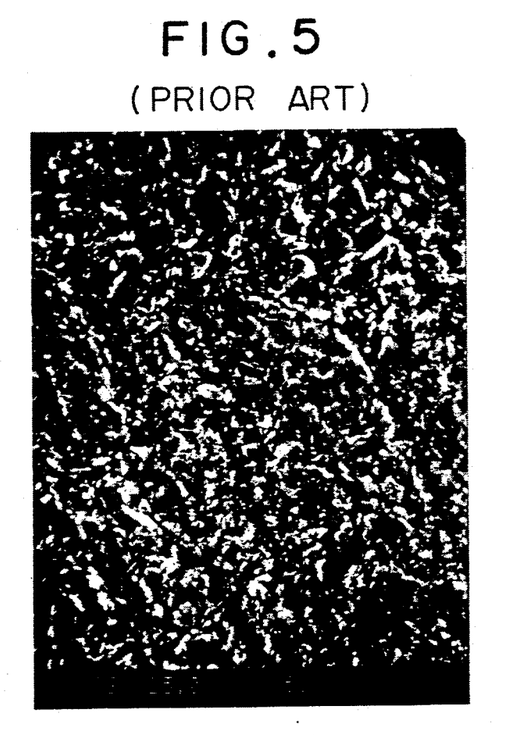
FIG. 5 is a scanning electron photomicrograph (×200) of the cross-section of the same conventional carbon electrode as used for obtaining the current density-potential curve of FIG. 3, which has been prepared by molding a carbon material blended with LiF and calcining the resultant molded product at 1,000° C.
Figure 6:
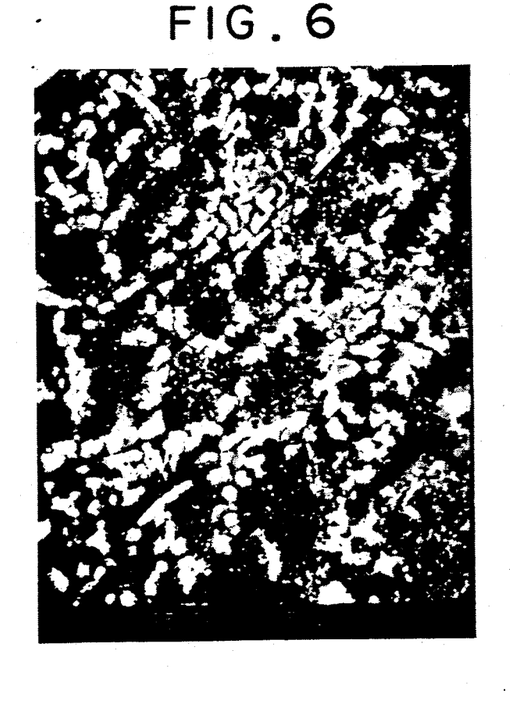
FIG. 6 is a scanning electron photomicrograph (×200) of the cross-section of the same carbon electrode of the present invention as used for obtaining the current density-potential curve of FIG. 4, which has been prepared by impregnating a porous carbon block with a metal fluoride mixture composed of LiF and KF.

The confirmation of the uniform packing of the metal fluoride mixture in the pores of the carbon electrode of the present invention, can be performed by slicing a carbon electrode of the present invention and polishing the surface exposed by the slicing, followed by observation of the exposed surface by a scanning electron microscope. A scanning electron photomicrograph of the cross-section of a carbon electrode of the present invention is shown FIG. 6. In FIG. 6, the uniform packing of the metal fluoride mixture at a high packing ratio is clearly observed. By contrast, with respect to the conventional carbon electrode having incorporated therein a metal fluoride, prepared by a method in which a metal fluoride such as LiF is blended with a carbon material for a carbon block, followed by molding and calcination, most of the metal fluoride is melted out and partly vaporized during the calcination, and the amount of the metal fluoride left in the carbon matrix phase of the resultant carbon block is very small and the metal fluoride is not present in the pores of the resultant carbon block. This can be confirmed by means of scanning electron photomicrograph and by surface analysis using an Electron Probe X-ray Microanalyzer (EPMA). A scanning electron photomicrograph of the cross-section of such a conventional carbon electrode is shown in FIG. 5.

As is understood from the above description, the carbon electrode of the present invention can be produced by the above-mentioned skillful method.

Accordingly, in another aspect of the present invention, there is provided a method for producing a carbon electrode having low polarizability, which comprises the steps of:

(1) providing a metal fluoride mixture composed of LiF and at least one metal fluoride other than LiF; said metal fluoride mixture having a melting temperature lower than that of LiF and having a surface tension lower than that of LiF at a temperature of not lower than the melting temperature of said metal fluoride mixture;

(2) heating said metal fluoride mixture to a temperature of not lower than the melting temperature thereof to obtain a molten metal fluoride mixture;

(3) contacting a porous carbon block with said molten metal fluoride mixture under a predetermined superatmospheric pressure to thereby introduce said molten metal fluoride mixture into the pores of said porous carbon block; and (4) cooling the resultant carbon block having said metal fluoride mixture contained therein to a predetermined temperature.

When the carbon electrode of the present invention is used as an anode in electrolyzing an electrolyte comprising a mixed molten salt system of potassium fluoride and hydrogen fluoride in an electrolytic cell, polarization of the anode is extremely low, and the anode effect is remarkably suppressed so that the electrolysis can stably be performed while exhibiting not only a high anodic current density but also a low voltage.

Accordingly, in a further aspect of the present invention, there is provided a method for producing fluorine, which comprises electrolyzing an electrolyte comprising a mixed molten salt system of potassium fluoride and hydrogen fluoride in an electrolytic cell having a carbon anode, said carbon anode being a carbon electrode comprising a porous carbon block and, contained in the pores of said porous carbon block, a metal fluoride mixture composed of LiF and a metal fluoride other than LiF.

Potassium fluoride and hydrogen fluoride which are main components of a mixed molten salt electrolyte of a KF-HF system may be used at various molar ratios in the range of not less than 1. The preferred molar ratio of HF to KF is 1.8 to 2.2.

With respect to a cathode material, there may be employed materials generally used for the electrolytic production of fluorine. Representative examples of these materials include iron, steel, nickel and Monel metal.

As mentioned above, when the carbon electrode of the present invention comprising a porous carbon block and, contained in the pores of said porous carbon block, a metal fluoride mixture composed of LiF and a metal fluoride other than LiF, is used as an anode in electrolyzing an electrolyte comprising a mixed molten salt system of potassium fluoride and hydrogen fluoride in an electrolytic cell, polarization of the anode is extremely low, and the anode effect is remarkably suppressed so that the electrolysis can stably be performed while exhibiting a high anodic current density and a low voltage.

For demonstrating the surprising effect of the electrolysis method of the present invention, anodic current density-potential curves (cyclic voltammograms) were obtained by the potential sweep method with respect to various carbon electrodes, using a mixed molten salt electrolyte of a KF-2HF system as an electrolyte bath and using nickel as a cathode. In the potential sweep method, the electrolysis temperature was 90° C., and potentials vs. $Pt/H_2$ were measured using as a reference electrode a platinum wire having $H_2$ bubbled thereon ($Pt/H_2$).

Types of carbon electrodes subjected to the measurements by the potential sweep method and types of electrolytes used are as follows:

Sample A (FIG. 1): an isotropic carbon block having an anisotropic ratio of 1:1 and containing no LiF (an electrolyte containing no LiF) (Comparative)

Sample B (FIG. 2): the same isotropic carbon block as Sample A (an electrolyte containing 3% by weight of LiF (Comparative)

Sample C (FIG. 3): a carbon block prepared by molding and calcining a mixture of a carbon material and 1% by weight of LiF (an electrolyte containing no LiF) (Comparative)

Sample D (FIG. 4): an isotropic carbon block having an anisotropic ratio of 1:1 and having contained in the pores thereof a metal fluoride mixture composed of LiF and KF at a packing ratio of 65% (an electrolyte containing no LiF) (Present Invention)

Note: anisotropic ratio is measured by the method described in U.S. Pat. No. 4,312,718

In the potential sweep method, the sweep was conducted by elevating the potential of the electrode from 0 V to 10 V at a sweep rate of 0.03 V/sec and subsequently lowering the potential of the electrode from 10 V to 0 V at a sweep rate of 0.03 V/sec to obtain a cyclic voltammogram. The electrolytic bath used had well been dehydrated by performing a preliminary electrolysis.

Figure 1:
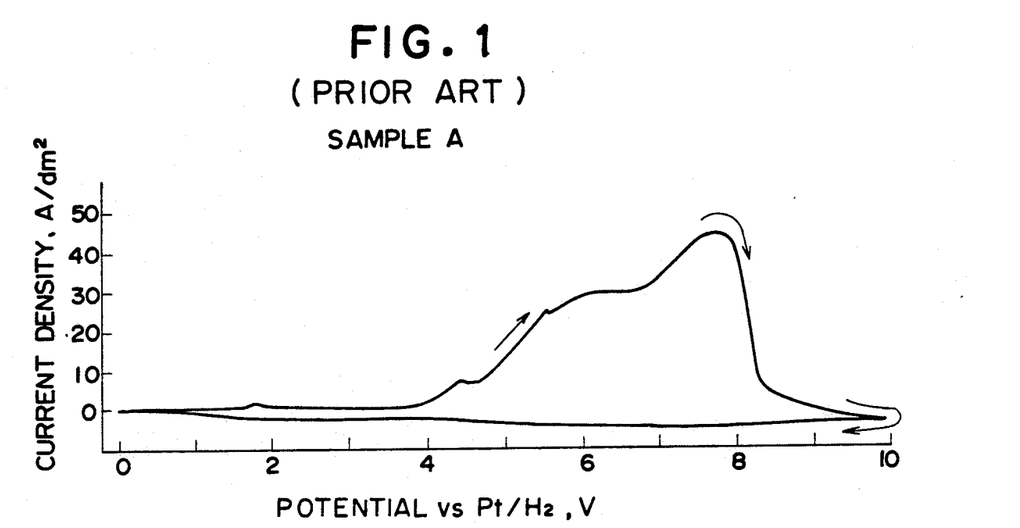
FIG. 1 shows a current density-potential curve obtained with respect to a conventional carbon electrode not impregnated with a metal fluoride mixture composed of LiF and KF, by the potential sweep method in which the carbon electrode is used as an anode in a molten salt electrolyte of a KF-2HF system containing no LiF.
Figure 2:
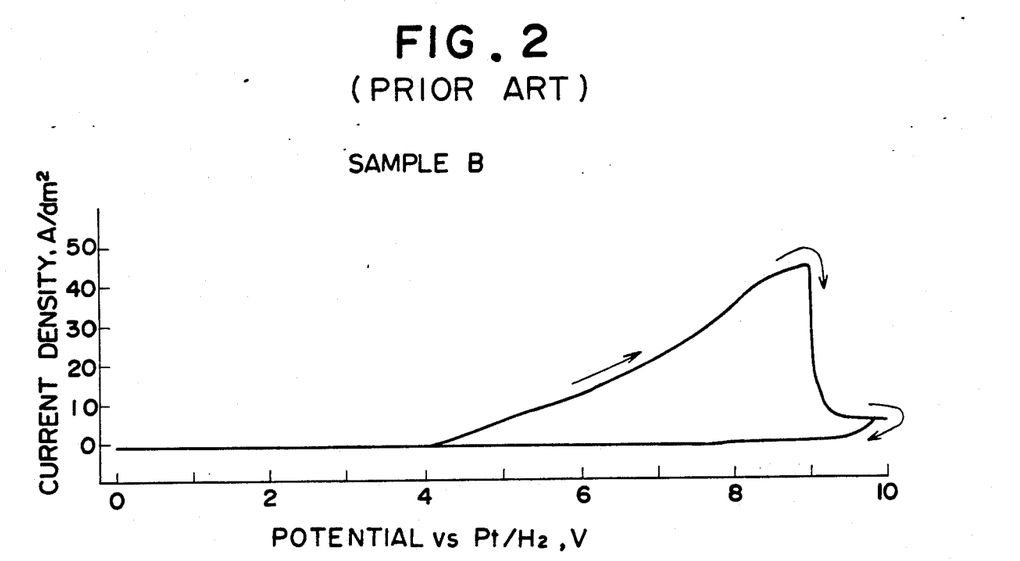
FIG. 2 shows a current density-potential curve obtained by the potential sweep method in which the same conventional carbon electrode as used for obtaining FIG. 1, but a molten salt of a KF-2HF system containing 3% by weight of LiF is used as an electrolyte.
Figure 3:
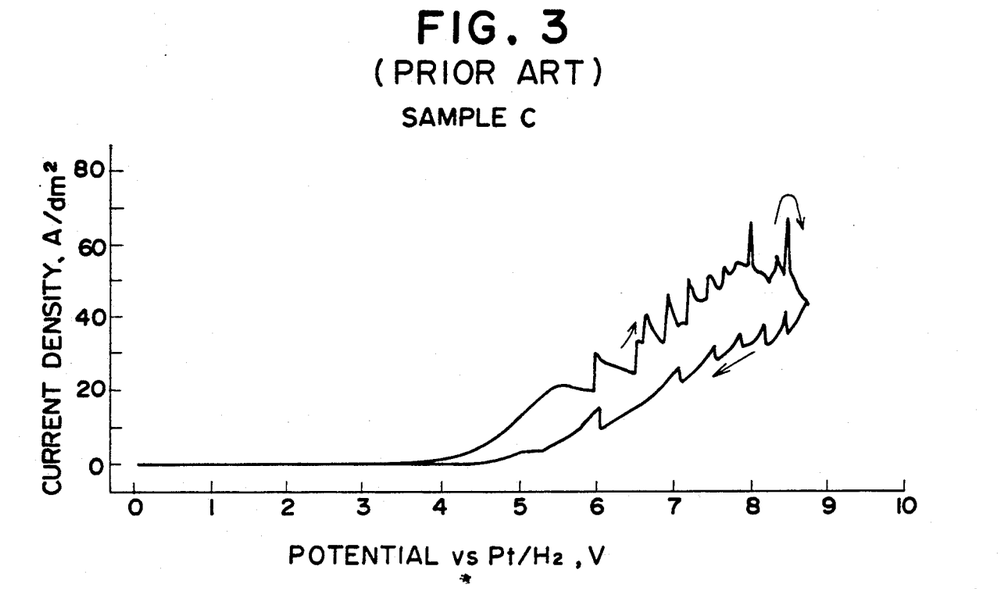
FIG. 3 shows a current density-potential curve obtained by the potential sweep method with respect to a conventional carbon electrode used as an anode in a molten salt electrolyte of a KF-2HF system containing no LiF, which conventional carbon electrode has been prepared by blending a carbon material, a pitch as a binder and LiF in an amount of 1% by weight, based on the total weight of the components and molding the resultant blend, followed by calcination.
Figure 4:
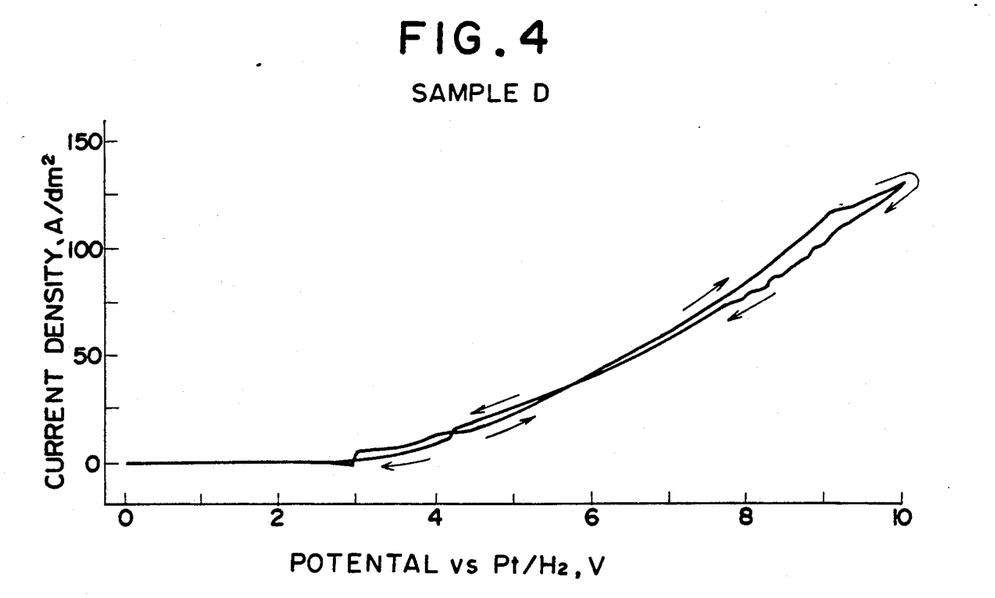
FIG. 4 shows a current density-potential curve obtained by the potential sweep method with respect to a carbon electrode of the present invention which is impregnated with a metal fluoride mixture composed of LiF and KF and which is used as an anode in a molten salt electrolyte of a KF-2HF system containing no LiF.

Results obtained using the above four types of carbon electrodes are shown in FIGS. 1 to 4. In FIGS. 1, 3 and 4, cyclic voltammograms obtained by the first sweep are individually shown. In FIG. 2, a cyclic voltammogram obtained by the seventh sweep is shown. In the case of Sample A (Comparative), when the potential of the electrode was elevated, the current density reached a maximum value (45 A/dm$^2$) at about 7.8 V, and the current density sharply decreased therefrom in the voltage range higher than 7.8 V due to the anode effect, as shown in FIG. 1. In the case of Sample B (Comparative), no sharp decrease in the current density was observed in the first to sixth sweeps, but in the seventh sweep the anode effect was observed at about 9.0 V, as shown in FIG. 2. In the case of Sample C (Comparative), the current density began to decrease at about 8.5 V, as shown FIG. 3. In the case of Sample D (Present invention), any anode effect did not occur so that the cyclic voltammogram obtained was stable, as shown in FIG. 4. The current density reached 125A/dm$^2$ at 10 V.

Further, with respect to Sample D, even if the number of sweeps was advanced up to the seventh, a cyclic voltammogram which is substantially the same as that obtained by the first sweep, was obtained. As is apparent from FIG. 1 and FIG. 4, in the case of Sample A, the potentials at 10A/dm$^2$ and at 30A/dm$^2$ are 4.8 V and 6.1 V, respectively, whereas in the case of Sample D, the potentials at 10A/dm$^2$ and at 30A/dm$^2$ are 3.8 V and 5.2 V, respectively, demonstrating that Sample D exhibits potentials 1 V and 0.9 V lower than those exhibited by Sample A at 10A/dm$^2$ and at 30A/dm$^2$, respectively. In the case of Sample C, the potential at a current density of 30A/dm$^2$ is 6.5 V whereas the potential at 30A/dm$^2$ of Sample D is 1.3 V lower than that of Sample C, as is apparent from FIGS. 3 and 4.

As apparent from above, the carbon electrode of the present invention is also advantageous from the viewpoint of energy saving. Further, many problems posed by the occurrence of the anode effect can be eliminated, leading to a saving of personnel expenses. Furthermore, the carbon electrode of the present invention is advantageous in that accumulation of a sludge of LiF on the bottom of the cell, which is a great problem caused by the addition of LiF to an electrolyte, is unlikely to occur. LiF as the active ingredient in the metal fluoride mixture has low solubility to a mixed molten salt electrolyte of KF-2HF system and, hence, dissolution of LiF into the electrolyte is unlikely to occur, so that LiF can stably be retained in the pores of the carbon block. Further, it is noted that when at least one metal fluoride other than LiF is an alkali metal fluoride, such as KF, NaF or CsF, the alkali metal fluoride present in the surface portion of the carbon electrode is dissolved into the electrolyte bath. However, for example an Na salt has an advantageous effect such that it removes Fe$^{3+}$ which has been dissolved from the cell and then accumulated by anodic oxidation, by forming an insoluble complex with Fe$^{3+}$.

The mechanism of the suppression of the anode effect by the carbon electrode of the present invention is believed to be as follows.

In the electrolysis using a conventional carbon electrode, graphite fluoride (CF) is likely to be formed on the surface of the electrode by the reactions respectively represented by formulae (1) and (2) below. The CF formed is thermally decomposed by the reaction of formula (3). When the rate of the reaction of formula (2) exceeds that of the reaction of formula (3), the amount of formed CF is increased. As a result, the wettability of the carbon electrode for the electrolyte is decreased. Thus, the current density becomes very high and polarization becomes extremely large, resulting in occurrence of the anode effect.

(1)

(2)

(3)

On the other hand, when LiF is present in the form of a molecule but not in the form of an ion, an intercalation compound ($C_x^+F^-$) is easily formed by the reaction of formula (4) below. This compound has good electrical conductivity and high surface energy, and is well wettable with the electrolyte. Further, another intercalation compound is formed by the reaction of formula (5) below, and $HF_2 (2HF \rightleftharpoons HF_2^- + H^+)$ discharges on the surface of this intercalation compound, thereby evolving $F_2$.

(4)

(5)

Depending on the reaction conditions, $C_x^+HF_2^-$ may be formed in addition to $C_x^+F^-$, but it has substantially the same properties as those of $C_x^+F^-$.

As described above, when the production of fluorine is performed according to the present invention by electrolyzing an electrolyte comprising a mixed molten salt system of potassium fluoride and hydrogen fluoride in an electrolytic cell using as an anode a carbon electrode comprising a porous carbon block and, contained in the pores of the porous carbon block, a metal fluoride mixture composed of LiF and a metal fluoride other than LiF, polarization of the anode is extremely small and the anode effect is remarkably suppressed, so that the electrolysis can stably be performed while exhibiting not only a high anodic current density but also a low voltage. Therefore, the method of the present invention for producing fluorine has a high commercial value.

Further, it is noted that the carbon electrode of the present invention can also be employed as an anode for electrolytic synthesis For example, $NF_3$ can advantageously be synthesized by electrolyzing an electrolyte comprising a mixed molten salt system of KF and 2HF having added thereto 20 to 30% by mole of $NH_4F$ in an electrolytic cell having as an anode the carbon electrode of the present invention, at a current density of 1 to $2A/dm^2$ and at an electrolyte bath temperature of 120° to 150° C. The $NF_3$ is a gas which is useful as, e.g., a stable fluorinating agent, an oxidizing agent for rocket fuel, a gas to be used for surface treatment of an inorganic or organic material. Use of the carbon electrode of the present invention as an anode in the electrolysis for producing $NF_3$ is extremely advantageous, since not only is the anode effect unlikely to occur, but also the current efficiency in the anode for forming $NF_3$ becomes high.

The present invention will be described in more detail with reference to the following Examples and Comparative Examples, which should not be construed as limiting the scope of the present invention.

EXAMPLE 1

An isotropic carbon block (5×30×0.8 mm) having an anisotropic ratio of 1:1 and having a bulk density of 1.67 $g/cm^3$ and a porosity of 24.1% was employed. The isotropic carbon block was produced in substantially the same manner as in REFERENCE EXAMPLE 1 of U.S. Pat. No. 4,312,718. Lithium fluoride and KF were mixed well at a molar ratio of 1:1 and the resultant mixture of LiF and KF was put in a graphite crucible. The crucible was placed in an electric oven and the metal fluoride mixture of LiF and KF was heated at 900° C. in a nitrogen atmosphere, thereby causing the mixture to be well melted, and the temperature was lowered to 600° C. Then, the porous carbon block was put in the crucible, and the porous carbon block was immersed in the molten metal fluoride mixture by means of pressing means made of carbon material, and held as it was immersed. The crucible was then placed in a pressure vessel and the internal pressure of the vessel was reduced to 50 mmHg, and heated at a temperature elevation rate of about 5° C./minute to a temperature such that the viscosity of the molten metal fluoride mixture composed of LiF and KF became 0.25 poise. The reduction of pressure was conducted not only for removing the air contained in the pores of the porous carbon block, thereby facilitating the introduction of the molten mixture into the pores of the porous carbon block, but also for preventing the porous carbon block from being oxidized. Next, an inert gas, such as nitrogen and argon, was introduced into the pressure vessel until the internal pressure reached 100 $kg/cm^2$, and the immersion of the porous carbon block in the molten metal fluoride mixture was maintained under that pressure for a period of about 1 hour. Subsequently, the carbon block was taken out of the pressure vessel, and left in the atmosphere to cool to room temperature, thereby obtaining a carbon block having contained in the pores thereof a metal fluoride mixture.

The thus obtained impregnated carbon block had a bulk density of 2.07 $g/cm^3$ and contained the metal fluoride mixture at a packing ratio of 65%. The LiF content of the impregnated carbon block was 10% by weight, base on the original porous carbon block. These results suggest that the metal fluoride mixture composed of LiF and KF was easily introduced into the pores of the carbon block.

With respect to the thus obtained carbon block having contained in the pores thereof a metal fluoride mixture, a cyclic voltammogram was obtained by the potential sweep method at a temperature of 90° C., using a mixed molten salt electrolyte of a KF-2HF system as an electrolyte bath. Nickel was used as a cathode and a 2 l electrolytic cell made of Teflon was used. The results were as shown in FIG. 4. FIG. 4 shows that in the electrolysis, no anode effect occurred, while exhibiting a high current density and a low voltage. As is apparent from the results, the effect of the introduction of a metal fluoride mixture composed of LiF and KF into the pores of the carbon block is extremely large.

Comparative Examples 1 to 2.

Substantially, the same electrolysis as in Example 1 was repeated except that there was used an isotropic carbon block (5×30×0.8 mm) having an anisotropic ratio of 1:1 and having no metal fluoride mixture contained therein. As the electrolytes in these Comparative Examples, a sufficiently dehydrated electrolyte containing no LiF and a sufficiently dehydrated electrolyte containing 3% by weight of LiF were individually used. Cyclic voltammograms were obtained. The cyclic voltammogram obtained using the electrolyte containing no LiF is shown in FIG. 1 and that obtained using the electrolyte containing 3% by weight of LiF is shown in FIG. 2. In each case, occurrence of the anode effect was observed. When these results are compared with the results of Example 1, it is clear that the carbon electrode of the present invention having contained in the pores thereof a specific metal fluoride mixture exhibits extremely excellent performances in the electrolysis of a molten salt system containing a fluoride.

Comparative Example 3

Substantially, the same electrolysis as in Example 1 was repeated except that there was used an isotropic carbon block (5×30×0.8 mm) having an anisotropic ratio of 1:1 and containing LiF in the carbon matrix phase which had been prepared by blending a carbon material with 1% by weight of LiF, followed by molding and calcination in substantially the same manner as in REFERENCE EXAMPLES 1 and 2 of U.S. Pat. No. 4,312,718. As the electrolyte in this Comparative Example, a sufficiently dehydrated electrolyte containing no LiF was used. A cyclic voltammogram was obtained. The cyclic voltammogram obtained is shown in FIG. 3. In this case, occurrence of the anode effect was observed.

Comparative Example 4

Substantially the same electrolysis as in Example 1 was repeated except that there was used an isotropic carbon block (5×30×0.8 mm) having an anisotropic ratio of 1:1 and containing LiF in the carbon matrix phase which had been prepared by blending a carbon material with 8% by weight of LiF, followed by molding and calcination in substantially the same manner as in REFERENCE EXAMPLES 1 and 2 of U.S. Pat. No. 4,312,718. As the electrolyte in this Comparative Example, a sufficiently dehydrated electrolyte containing no LiF was used. The carbon electrode broke during the practice of the sweep method, and electrolysis could not be continued.

What is claimed is:

1. A carbon electrode having low polarizability, comprising a porous carbon block and, contained in the pores of said porous carbon block, a metal fluoride mixture consisting essentially of LiF and a metal fluoride other than LiF, wherein the amount of metal fluoride mixture contained in the pores of said porous carbon block is such that the amount of LiF is 0.5 to 30% by weight, based on the porous carbon block, which electrode, when used as an anode in an electrolytic cell in which an electrolysis process is being carried out in which fluorine evolves at the anode, exhibits suppression of abrupt spontaneous rise of voltage and decrease of current during the electrolysis known as the anode effect.

2. A carbon electrode according to claim 1, wherein said metal fluoride other than LiF is at least one metal fluoride selected from the group consisting of KF, NaF, CsF, $MgF_2$, $CaF_2$ and $AlF_3$.

3. A method for producing fluorine, which comprises electrolyzing an electrolyte comprising a mixed molten salt system of potassium fluoride and hydrogen fluoride in an electrolytic cell having a carbon anode, said carbon anode being a preformed carbon electrode comprising a porous carbon block and, contained in the pores of said porous carbon block, a metal fluoride mixture consisting essentially of LiF and a metal fluoride other than LiF, said carbon anode suppressing an abrupt spontaneous rise of voltage and decrease of current during the electrolysis known as the anode effect.

4. A method according to claim 3, wherein said metal fluoride other than LiF is at least one metal fluoride selected from the group consisting of KF, NaF, CsF, $MgF_2$, $CaF_2$ and $AlF_3$.

5. A method according to claim 3, wherein the amount of metal fluoride mixture contained in the pores of said porous carbon block is such that the amount of LiF is 0.5 to 30% by weight, based on the porous carbon block.

* * * * *